(12) United States Patent
Iida (10) Patent No.: US 6,590,642 B2
(45) Date of Patent: Jul. 8, 2003

(54) APPARATUS FOR INSPECTING FIBER WITH OPTICAL CONNECTOR (75) Inventor: Rikihiro Iida, Kanagawa (JP)

(73) Assignee: Ando Electric Co., Ltd., Kanagawa (JP)

( * ) Notice: Subject to any disclaimer, the term of this patent is extended or adjusted under 35 U.S.C. 154(b) by 79 days.

(21) Appl. No.: 09/771,869

(22) Filed: Jan. 29, 2001

(65) Prior Publication Data
US 2001/0010581 A1 Aug. 2, 2001

(30) Foreign Application Priority Data
Jan. 31, 2000 (JP) ........................................ 2000-022868

(51) Int. Cl.$^7$ .............................................. G01N 21/00
(52) U.S. Cl. ....................................................... 356/73.1
(58) Field of Search .................................. 356/73.1, 479, 356/44; 359/124, 248, 305, 110, 177; 385/134, 100, 50–78, 33–38, 80, 85, 92; 250/227.11–227.28

(56) References Cited

U.S. PATENT DOCUMENTS 5,090,802 A * 2/1992 Longhurst .................. 356/73.1
5,754,284 A * 5/1998 Leblanc et al. ............ 356/73.1

* cited by examiner

Primary Examiner—Tu T. Nguyen
(74) Attorney, Agent, or Firm—Fish & Richardson P.C.

(57) ABSTRACT

A light source 1 is connected to a first terminal of an optical branch coupler 2, and a first optical sensor 3 is connected to a second terminal. A second optical sensor 4 is connected to a fourth terminal, and a master optical connector 7 is connected to a third terminal. While a measured optical fiber 5 is connected to the master optical connector 7, the power of light received by the first optical sensor 3 and the power of light received by the second optical sensor 4 are detected. The insertion loss and return loss of the optical fiber 5 are computed from the power values of received light detected by a measurement unit 10.

6 Claims, 6 Drawing Sheets

*FIG. 3A* MEASUREMENT OF SAMPLE OF REFLECTION

*FIG. 3B* MEASUREMENT OF SYSTEM CONSTANT

APPARATUS FOR INSPECTING FIBER WITH OPTICAL CONNECTOR

BACKGROUND OF THE INVENTION

1. Field of the Invention

The present invention relates to an inspection apparatus for inspecting a fiber having optical connectors, which apparatus measures the return loss and insertion loss of a fiber having optical connectors.

Fibers having optical connectors have been used in considerably broad fields, such as the field of optical transmission systems and the field of optical device measurement. In order to improve production efficiency, a process of manufacturing a fiber having optical connectors is demanded to measure a return loss and an insertion loss, which are basic characteristics of an optical connector, without involvement of intricate operations and within a short period of time.

Figure 5:
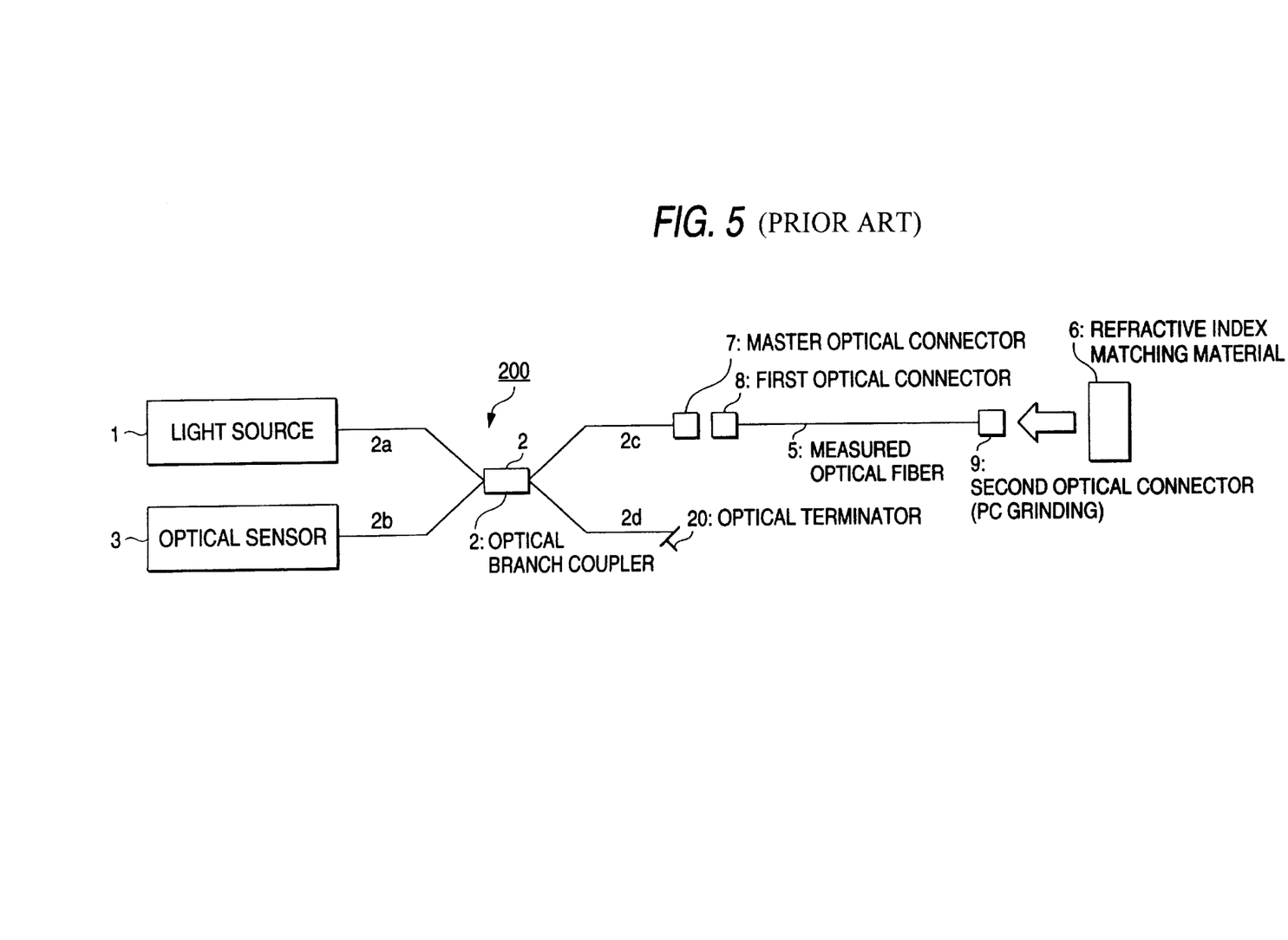
FIG. 5 is a block diagram showing an example of a return loss measurement construction of a related-art inspection apparatus 200 for inspecting a fiber having optical fibers.

A related-art method of measuring a return loss of an optical connector will be described by reference to FIG. 5. As shown in FIG. 5, a fiber inspection system 200 having an optical connector for use with the related-art return loss measurement method comprises a light source 1; an optical branch coupler 2; a first optical sensor 3; a refractive index matching material 6; a master optical connector 7; and an optical terminator 20. Optical connectors are provided on both ends of a measured optical fiber 5. In the following description, an optical connector provided on one end of the optical fiber 5 and connected to the master optical connector 7, is called a first optical connector 8, and an optical connector provided on the other end of the optical fiber 5 is called a second optical connector 9.

Conventionally, when the return loss of an optical fiber having connectors is measured, the light source 1 is connected to a first terminal 2a of the optical branch coupler 2, and the first optical sensor 3 is connected to a second terminal 2b of the optical branch coupler 2. The master optical connector 7 is connected to a third terminal 2c of the optical branch coupler 2, and the optical terminator 20 is connected to a fourth terminal 2d of the optical branch coupler 2. Fresnel reflection arising at the master optical connector 7 is received by the first optical sensor 3, and the power of the thus-received light is taken as a reference.

The first optical connector 8 of the measured optical fiber 5 is connected to the master optical connector 7, and the second optical connector 9 of the measured optical fiber 5 is terminated with the refractive index matching material 6. With such an arrangement, light reflected from the measured optical fiber 5 is received by the first optical sensor 3. A difference between the power of the thus-received light and the reference is computed, thereby computing a return loss.

A related-art method of measuring insertion loss of an optical connector will now be described by reference to FIG. 6B. As shown in FIG. 6B, an inspection system 201 for inspecting an optical fiber having connectors and for use with a related-art method of measuring an insertion loss of a connector comprises a light source 1; a master optical connector 7; and an optical sensor 21. A measured fiber 5 is provided with an optical connectors 8 and 9 in the same manner as the measured fiber 5 shown in FIG. 5.

Figure 6A:
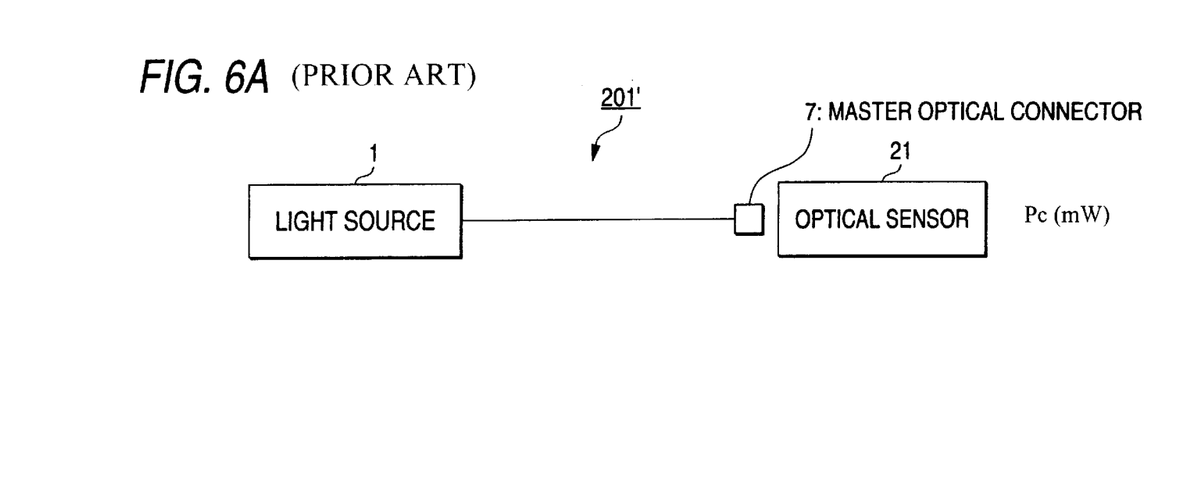
FIGS. 6A and 6B are block diagrams showing an example of an insertion loss measurement construction of the related-art inspection apparatus 200.
Figure 6B:
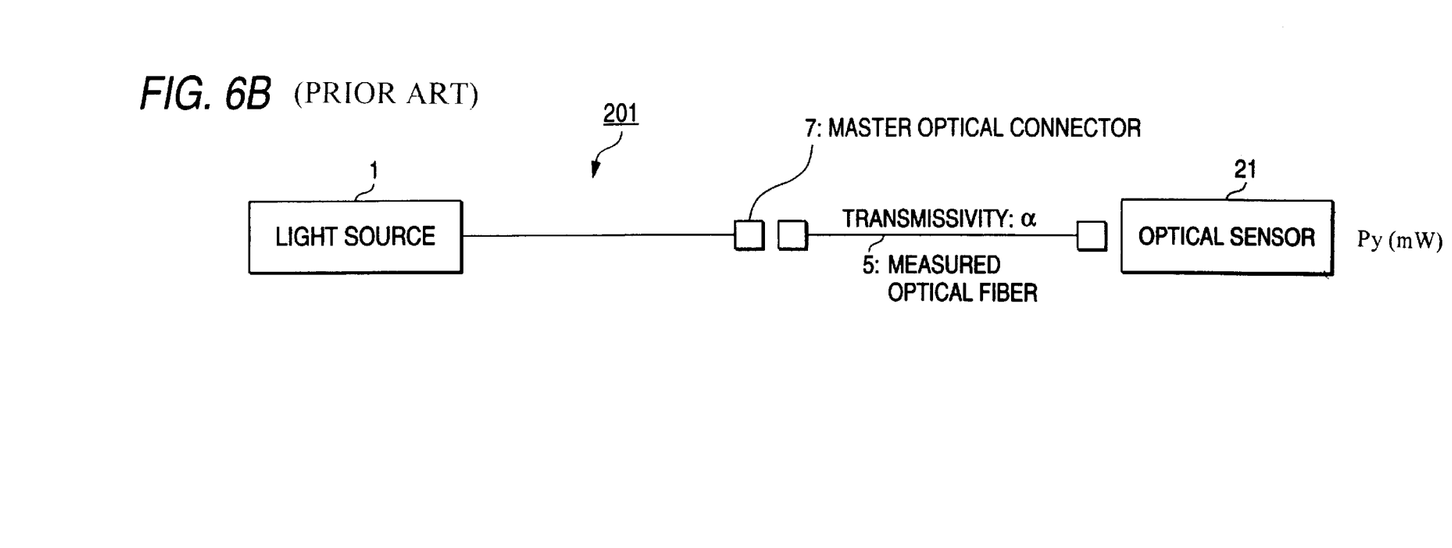

Conventionally, when an insertion loss of an optical fiber having connectors is measured, an output of the light source 1 is connected to an input of the optical fiber, in the same manner as in an inspection system 201' for inspecting a fiber having optical connectors shown in FIG. 6A. Light output from the master optical connector 7 is received by an optical sensor 21, and the power of the thus-received light Pc is taken as a reference value. In the same manner as in an inspection system 201 for inspecting a fiber having optical connectors shown in FIG. 6B, the measured optical fiber 5 is connected to the master optical connector 7, and light output from the master optical connector 7 is received by an optical sensor 21. A difference between the power Py of the light received by the optical sensor 21 in this case and the reference value Pc is taken as an insertion loss of the connector.

A related-art expression for computing an insertion loss of a connector is expressed as Eq. (1).

$$IL = -10 \log(Pc/Py) + 10 \log \alpha \qquad (1)$$

where α represents the transmissivity of an optical fiber.

According to the related-art technique, the return loss of the measured optical fiber 5 and the insertion loss of the same are measured separately through use of different measurement systems. Hence, the measured optical fiber 5 must be reconnected for changing the measurement item. A result of measurement corresponds to measure value of the entire system, including both the measured optical fiber 5 and the optical connectors, thereby rendering vague in a decision as to whether or not processed optical connectors are non-defective.

SUMMARY OF THE INVENTION

The present invention is aimed at improving inspection efficiency during a process of manufacturing a fiber having optical connectors, by means of measuring a return loss and an insertion loss, which are basic characteristics of an optical connector, without reconnection of an optical fiber to be measured.

Figure 1:
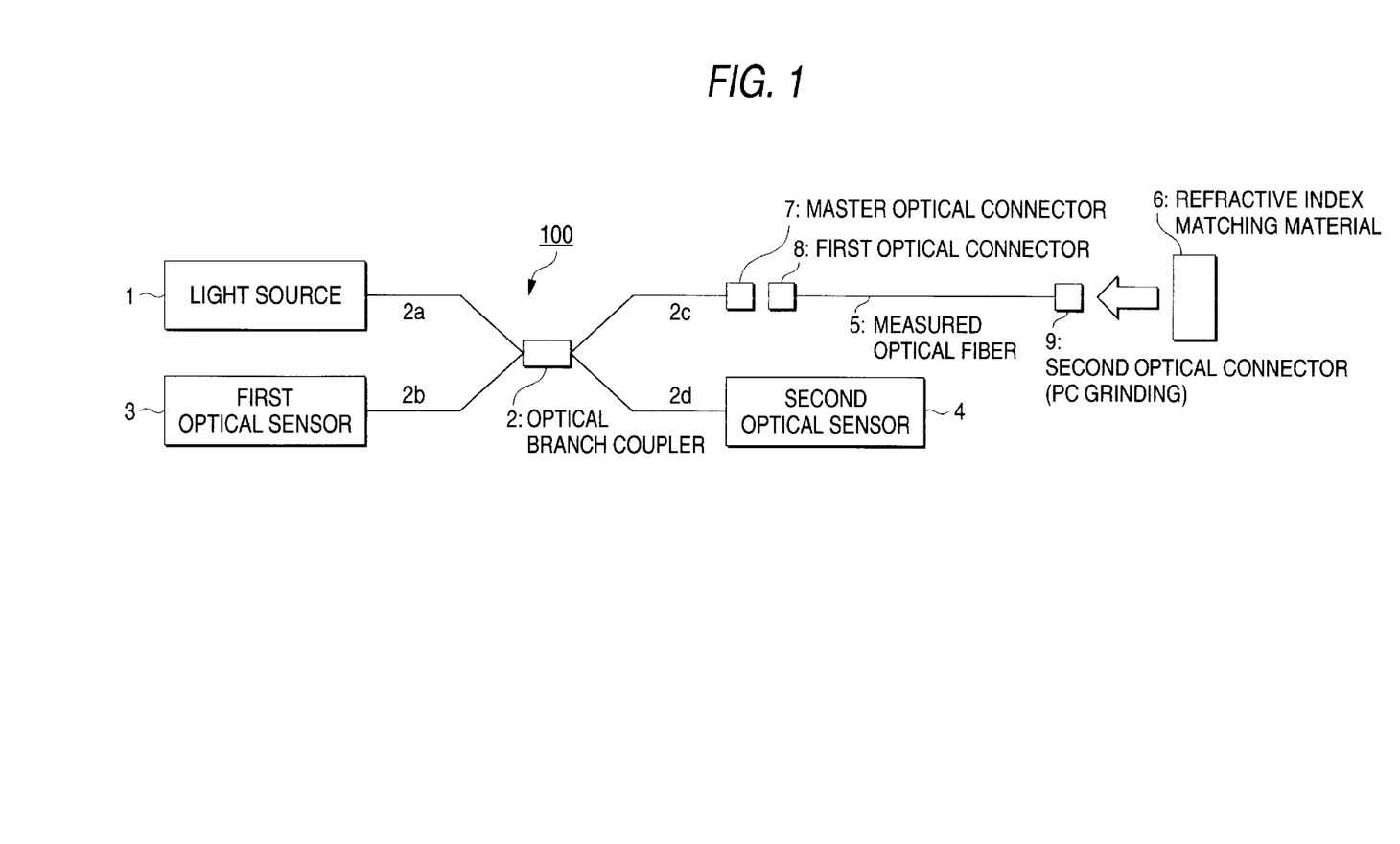
FIG. 1 is a block diagram showing an example construction of an inspection apparatus 100 for inspecting a fiber having optical connectors according to the present invention.

In order to solve the drawbacks, a first aspect of the present invention provides an inspection apparatus for inspecting an optical fiber having two optical connectors at both ends thereof, comprising:

an optical branch coupler (for example, an optical branch coupler 2 shown in FIG. 1) having a first to four input/output terminal (for example, a first terminal 2a, a second terminal 2b, a third terminal 2c, and a fourth terminal 2d, which are shown in FIG. 1), the optical branch coupler branching and outputting light to third and fourth terminals when the first or second terminal is taken as an input terminal, the optical branch coupler branching and outputting light to the first and second terminals when the third or fourth terminal is taken as an input terminal;

a light source (for example, a light source 1 shown in FIG. 1) connected to the first terminal of the optical branch coupler;

a first optical sensor (for example, a first optical sensor 3 shown in FIG. 1) connected to the second terminal of the optical branch coupler;

a second optical sensor (for example, a second optical sensor 4 shown in FIG. 1) connected to the fourth terminal of the optical branch coupler;

a master optical connector (for example, a master optical connector 7 shown in FIG. 1) connected to the third terminal of the optical branch coupler; and a measurement unit (for example, a measurement unit 10 shown in FIG. 2), wherein Fresnel reflection occurs in a state where the master optical connector is released, power of the Fresnel reflection received by the first optical sensor is defined as a first reference;

the measurement unit measures an insertion loss based on the first reference and power of light received by the first optical sensor when one of two optical couplers of the optical fiber is connected to the master optical connector and the other thereof is released; and when one of two optical couplers of the optical fiber is connected to the master optical connector and the other thereof is terminated, the measurement unit measures a return loss based on power of light received by the first optical sensor and power of light emitted from the light source and received by the second optical sensor.

According to a first aspect of the present invention, the light source is connected to the first terminal of the optical branch coupler having four input/output terminals; the first optical sensor is connected to the second terminal of the same; the master optical connector is connected to the third terminal of the same; and the second optical connector is connected to the fourth terminal of the same. Fresnel reflection occurs in a state where the master optical connector is released, and power of the Fresnel reflection received by the first optical sensor is defined as a first reference. The measurement unit measures an insertion loss based on the first reference and power of light received by the first optical sensor when one of two optical couplers of the optical fiber is connected to the master optical connector and the other thereof is released. When one of two optical couplers of the optical fiber is connected to the master optical connector and the other thereof is terminated, the measurement unit measures a return loss based on power of light received by the first optical sensor and power of light emitted from the light source and received by the second optical sensor.

Accordingly, the return loss and insertion loss of the optical fiber can be measured through use of the single measurement system, thereby obviating a necessity for reconnecting the optical fiber according to measurement items. Eventually, production efficiency in a process of manufacturing a fiber having optical connectors is improved.

In a second aspect of the present invention, the inspection apparatus according to the first aspect, further comprises:

a unit transmission loss storage section (for example, RAM 14 shown in FIG. 2) adapted to store a transmission loss of the optical fiber per unit-length in advance; and an input unit (for example, an input unit 12 shown in FIG. 2) adapted to input a length of the optical fiber, wherein the measurement unit includes a connector insertion loss computation section (for example, a CPU 11 shown in FIG. 2) adapted to compute a transmission loss of the optical fiber from the transmission loss of the optical fiber per unit-length and the length of the optical fiber, the connector insertion loss computation section adapted to compute an insertion loss of an optical connector portion by means of subtracting the transmission loss of the optical fiber from the insertion loss.

According to the second aspect of the invention, the transmission loss of the optical fiber per unit length is stored in the unit transmission loss storage section in advance, and the input unit inputs the length of the optical fiber. The connector insertion loss computation section of the measurement unit computes the transmission loss of the optical fiber from the transmission loss of the optical fiber per unit-length stored in the unit transmission loss storage unit and the length of the optical fiber input by the input unit.

Further, the connector insertion loss computation unit computes the insertion loss of the optical connector by means of subtracting the computed transmission loss of the optical fiber from the insertion loss.

In third aspect of the invention, the inspection apparatus according to the first aspect, further comprising a fiber transmission loss storage section (for example, RAM 14 shown in FIG. 2) adapted to store in advance a transmission loss of the optical fiber, and the measurement unit includes a connector insertion loss computation section (for example, a CPU 11 shown in FIG. 2) adapted to compute an insertion loss of a optical connector portion by means of subtracting the transmission loss of the optical fiber from the insertion loss.

According to the third aspect of the invention, the transmission loss of the optical fiber is stored in the fiber transmission loss storage unit in advance. The connector insertion loss computation section of the measurement unit computes the insertion loss of the connector portion by means of subtracting the transmission loss of the optical fiber stored in the fiber transmission loss storage unit from the insertion loss.

According to the second and third aspect of the invention, the transmission loss of the optical fiber can be subtracted from a measurement result of the insertion loss. Hence, the insertion loss of the optical connector portion becomes definite, thereby enabling easy determination as to whether or not a processed optical connector is non-defective.

In fourth aspect of the invention, the inspection apparatus according to the first aspect, further comprises:

a unit backscattering amount storage section (for example, RAM 14 shown in FIG. 2) adapted to store an amount of backscattering of the optical fiber per unit-length in advance; and an input unit (for example, an input unit 12 shown in FIG. 2) adapted to input a length of the optical fiber, wherein the measurement unit includes a connector return loss computation section (for example, a CPU 11 shown in FIG. 2) adapted to compute an amount of backscattering of the optical fiber from the amount of the backscattering of the optical fiber per unit-length and the length of the optical fiber, the connector return loss computation section adapted to compute a return loss of an optical connector portion by means of subtracting the amount of the backscattering of the optical fiber from the total return loss.

According to the fourth aspect of the present invention, the amount of the backscattering of an optical fiber per unit-length is stored in the unit backscattering storage unit in advance, and the length of the optical fiber is input by input unit. The connector return loss computation section of the measurement unit computes the amount of the backscattering of the optical fiber from the amount of the backscattering of the optical fiber per unit-length stored in the unit backscattering storage unit and the length of the optical fiber input by the input unit. The connector return loss computation unit computes the return loss of the optical connector by means of subtracting the amount of the backscattering of the optical fiber from the return loss.

Figure 2:
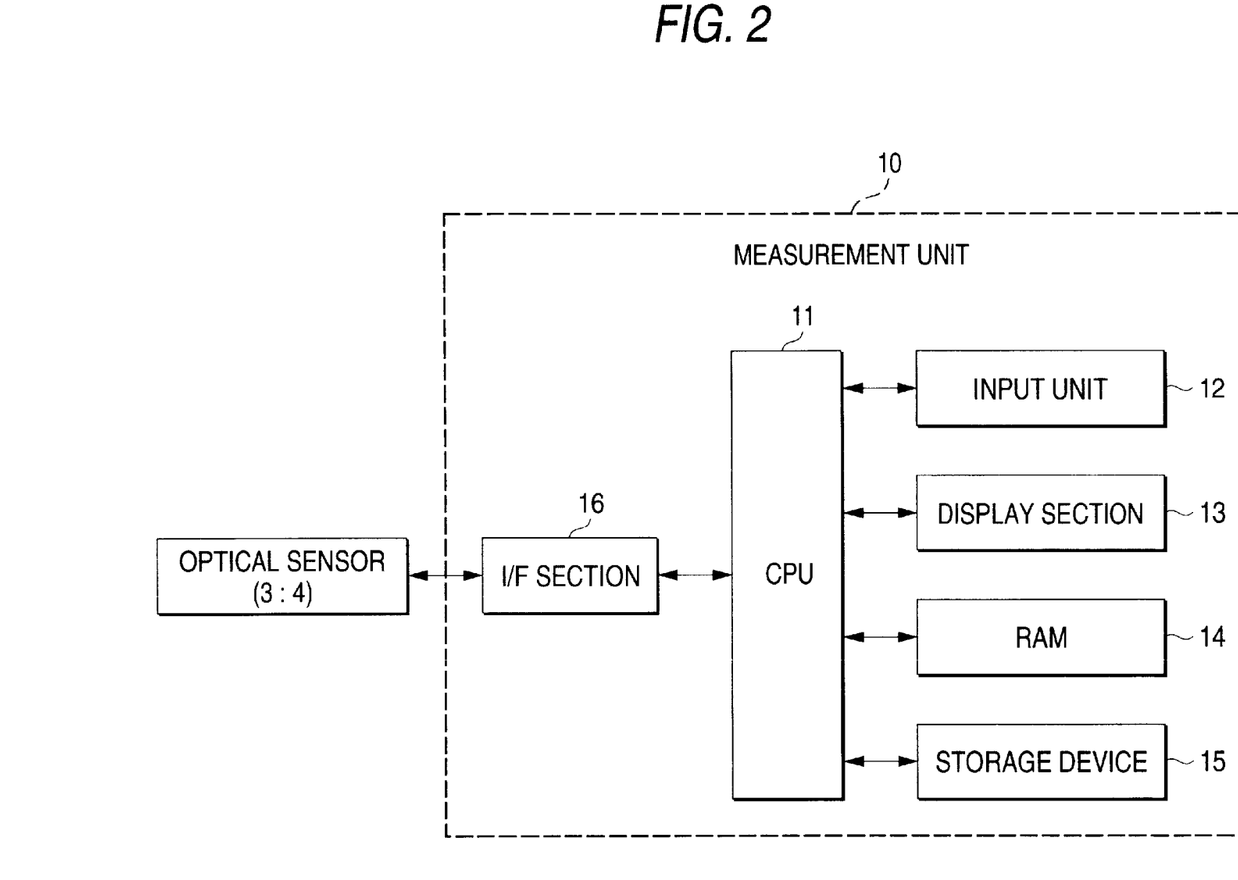
FIG. 2 is a block diagram showing construction of a principal section of a measurement unit 10.

In fifth aspsect of the invention, the inspection apparatus according to the first aspect, further comprises an optical fiber backscattering amount storage section (for example, RAM 14 shown in FIG. 2) adapted to store an amount of backscattering of the optical fiber beforehand, wherein the measurement unit includes a connector return loss computation section (for example, a CPU 11 shown in FIG. 2)

adapted to compute a return loss of an optical connector portion by means of subtracting the amount of the backscattering of the optical fiber from the total return loss.

According to the fifth aspect of the invention, the amount of the backscattering of the optical fiber is stored in optical fiber backscattering storage unit in advance. The connector return loss computation section of the measurement unit computes the return loss of the optical connector portion, by means of subtracting the amount of the backscattering of the optical fiber stored in the optical fiber backscattering storage section from the return loss.

Hence, according to the fourth and fifth aspect of the present invention, the amount of the backscattering of the optical fiber can be subtracted from the measurement result of the return loss. Accordingly, the insertion loss of the optical connector becomes definite, thereby enabling an easy determination as to whether or not a processed optical connector is non-defective. Particularly, the present invention is effective in the case of a long optical fiber.

In sixth aspect of the invention, the inspection apparatus according to the first to fifth aspect, further comprises
- a defective/non-defective determination reference value setting unit (for example, an input unit 12 and RAM 14, which are shown in FIG. 2) adapted to set defective/non-defective determination reference values in relation to a return loss and an insertion loss, respectively; and
- a determination section (for example, a CPU 11 shown in FIG. 2) adapted to determine whether or not the optical fiber having the optical connectors is defective, by means of comparing the defective/non-defective determination reference values with the total return loss and the total insertion loss, respectively.

According to the sixth aspect of the invention, the defective/non-defective determination reference value setting unit sets the defective/non-defective determination reference value in relation to the return loss and the insertion loss. The determination section determines whether or not the optical fiber having the optical connectors is defective, by means of comparing the defective/non-defective determination reference values with the return loss and the insertion loss measured by the measurement unit, respectively.

Since the determination as to whether or not the optical fiber having the optical connectors is non-defective is made automatically, whether or not the optical fiber is non-defective can be readily checked, without involvement of an examination of real data concerning the return loss and the insertion loss. Thus, the optical fiber having the optical connectors can be inspected efficiently.

DETAILED DESCRIPTION OF THE INVENTION

Embodiments of the present invention will be described in detail with reference to drawings hereinbelow.

[First Embodiment]

A construction will first be described.

As shown in FIG. 1, an inspection apparatus 100 for inspecting a fiber having optical connectors according to the present invention comprises a light source 1; an optical branch coupler 2; a first optical sensor 3; a second optical sensor 4; a refractive index matching material 6; a master optical connector 7; and a measurement unit 10 shown in FIG. 2. At the time or measurement of a return loss and an insertion loss, a measured optical fiber is connected to the master optical connector 7.

The optical fiber S is a fiber to be measured having an optical connector at both ends thereof. Namely, the measured optical fiber 5 is constituted of an optical fiber portion which is formed to an arbitrary length from glass, synthetic resin, or a like material, and optical connectors provided both ends of the optical fiber portion. In the following description, an optical connector provided at an end of the measured optical fiber 5 to be connected to the master optical connector 7 is called a first optical connector 8, and an optical connector provided at the other end of the fiber S is called a second optical connector 9 (outgoing end).

The measured optical fiber 5 transmits light output from the light source 1 and input to the first optical connector 8 side of the measured optical fiber 5 through the optical branch coupler 2 and the master optical connector 7. Further, the optical fiber 5 transmits and outputs light reflected by the second optical connector 9 to the master optical connector 7. The thus-output reflected light is output, through the optical branch coupler 2, to the first optical sensor 3, where the power of the received light is detected. The second optical connector 9 and the master optical connector 7 have been subjected to identical connector face processing (spherical grinding). The reflectivity of them correspond to Fresnel reflection (Rf=about 4%), for example, which arises from difference in refractive index between quartz serving as a core material of an optical fiber and air.

The light source 1 is constituted of, for example, a distributed feedback (DFB) laser. The light source 1 generates light of predetermined wavelength and predetermined power. The thus-generated light is output to the first and second optical sensors 3 and 4 through the optical branch coupler 2 and the optical fiber 5.

The optical branch coupler 2 has four input/output terminals 2a, 2b, 2c, and 2d. When the first terminal 2a or the second terminal 2b are used as input terminals, light is branched and output to the third terminal 2c and the fourth terminal 2d. When the third terminal 2c or the fourth terminal 2d are used as input terminals, light is branched and output to the first terminal 2a and the second terminal 2b.

The first optical sensor 3 and the second optical sensor 4 are photodetectors constituted of, for example, photodiodes. Each of the sensors converts the intensity of detected light (i.e., the power of received light) into an electric signal and outputs the signal as received light data to a CPU 11 (as shown in FIG. 2) provided in the measurement unit 10. The first optical sensor 3 is connected to the second terminal 2b of the optical branch coupler 2, and the second optical sensor 4 is connected to the fourth terminal 2d.

The refractive index matching material 6 is used as a terminating member of the second optical connector 9. The second optical connector 9 of the optical fiber 5 is terminated by the refractive index matching material 6 or released according to measurement item. More specifically, when the return loss of the optical fiber 5 is measured, the second optical connector 9 is terminated. When the insertion loss of the optical fiber 5 is measured, the second optical connector 9 is released.

As shown in FIG. 2, the measurement unit 10 comprises a CPU (central processing unit) 11, an input unit 12, a display section 13, RAM (random access memory) 14, a storage device 15, and an I/F (interface) section 16.

The CPU 11 uncompresses, into an unillustrated program storage area within the RAM 14, a system program stored in the storage device 15 and an application program selected from among application programs complying with an inspection system. Various instructions or data input from the input unit 12 are temporarily stored in the RAM 14. In response to the input instructions or data, the CPU 11 performs various processing operations in accordance with the application program stored in the storage device 15. The result of processing is stored in the RAM 14 and is displayed on the display section 13. The processing result stored in the RAM 14 is preserved in a location within the storage device 15 specified by an instruction input from the input unit 12.

The CPU 11 measures a return loss and an insertion loss, which are items to be measured by the inspection apparatus 100. At this time, the CPU 11 performs measurement and computing operations based on a measurement processing program stored in the storage device 15. During a measurement operation, the first optical sensor 3 and the second optical sensor 4 measure received light data under predetermined conditions and store the result of measurement in the RAM 14. For instance, the predetermined conditions relate to a state in which the second optical connector 9 is terminated or released. In a computing operation, a return loss and an insertion loss are computed from the received light data stored in the RAM 14, a reference value described later [i.e., a reference return loss (a system reflection P0) and a reference insertion loss Pb], and system constants described later (a transfer constant C1 and a branching ratio C2), based on a return loss computation equation described later [referring to Eq. (5) described later] and an insertion loss computation equation [referring to Eq. (8) described later]. The principles of measuring a return loss and an insertion loss will be described later.

The input unit 12 comprises an input panel or keyboard, a touch panel, and a mouse, wherein the input panel or keyboard includes cursor keys, numeric keys, function keys, and switches. The input unit 12 outputs to the CPU 11 a button-press signal corresponding to a pressed button or a position signal corresponding to a touch panel or a mouse.

The display section 13 is constituted of a CRT (cathode ray tube) or a liquid-crystal display and displays data input from the CPU 11.

The RAM 14 constitutes a program storage area into which the CPU 11 uncompresses data at the time of executing the application program. When the CPU 11 performs measurement and computing operations in accordance with the measurement program, the RAM 14 constitutes a memory location for storing the received light data detected by the first and second optical sensors 3 and 4, system constants, reference-value data, and coefficients required for computation.

A program or data are stored in the storage device 15 in advance, and the storage device 15 is constituted of a magnetic recording medium, an optical recording medium, or semiconductor memory. The storage device 15 may be fixed to or removably attached to the measurement unit 10. The storage device 15 stores data processed by the system program, the application programs, and a processing program.

The I/F section 16 transmits, to the CPU 11, the received light data entered by way of the first and second optical sensors 3 and 4 provided in the inspection apparatus 100.

The principle of measuring the return loss and insertion loss of the optical fiber having optical connectors will now be described.

In a first embodiment, when the return loss and insertion loss of the optical fiber are measured, the light source 1 is connected to the first terminal 2a of the optical branch coupler 2, and the first optical sensor 3 is connected to the second terminal 2b of the optical branch coupler 2. The master optical connector 7 is connected to the third terminal 2c of the optical branch coupler 2, and the second optical sensor 4 is connected to the fourth terminal 2d of the optical branch coupler 2.

Figure 3A:
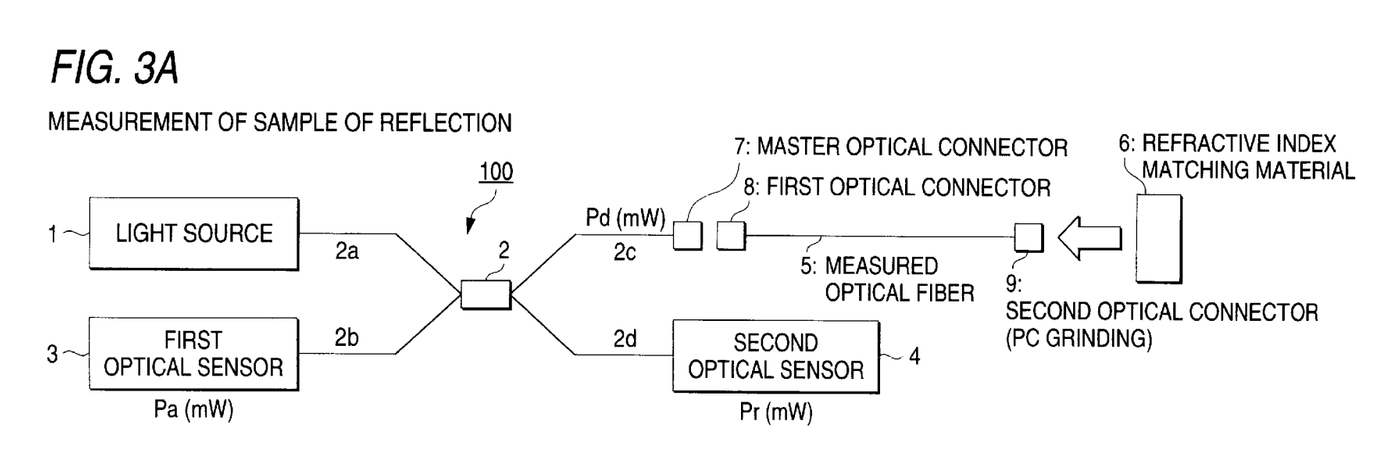
FIGS. 3A and 3B are illustrations for describing a method of measuring a return loss employed by the inspection apparatus 100 according to the present invention.
Figure 3B:
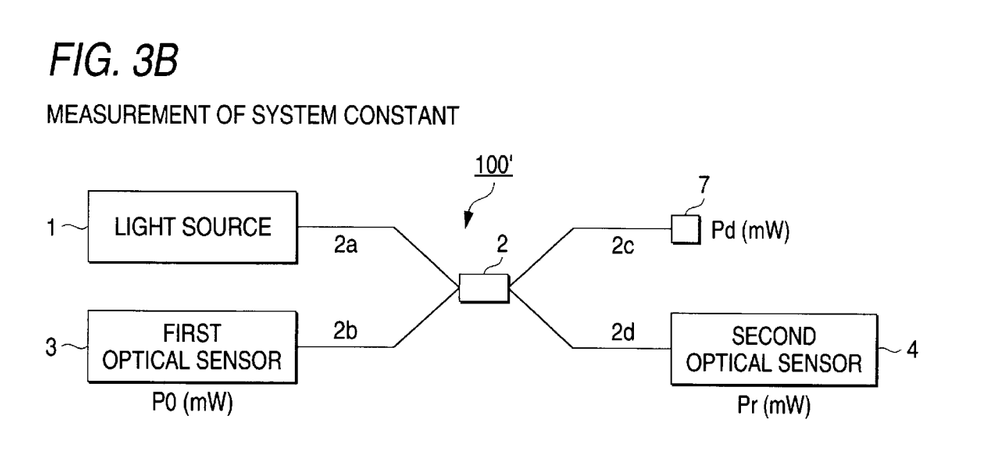

FIGS. 3A and 3B show a method of measuring a return loss. First, a system constant is measured. The system constant is a constant unique to an inspection system and is measured for each unit at manufacturing stage. The thus-measured system constants are written into memory. As shown in FIG. 3B, in order to compute power Pd at which light enters the optical fiber 5 (hereinafter called "incidence power") and the reflection of the inspection system P0 (hereinafter called "system reflection P0"), a branching ratio between the third terminal 2c and the fourth terminal 2d of the optical branch coupler 2 (a $3^{rd}$-$4^{th}$ branching ratio: C2=Pr/Pd), a coefficient of a transmission path from the third terminal 2c to the second terminal 2b (a $3^{rd}$-$2^{nd}$ transmission coefficient: C1), and a transfer constant C3=P0/Pr are measured. The branching ratio C2 is determined by means of measuring light output from the third terminal 2c and light output from the fourth terminal 2d when the light source 1 is connected to the first terminal 2a of the optical branch coupler 2. The transmission coefficient C1 is determined by means of measuring the light output from the second terminal 2b when the light source 1 is connected to the third terminal 2c of the optical branch coupler 2.

Here, the incidence power Pd at which light enters the optical fiber 5 can be computed from optical power Pr measured at the second optical sensor 4 and the branching ratio C2 (C2=Pr/Pd). The system reflection P0 can be determined by means of multiplying the received light power Pr of the second optical sensor 4 by the transfer constant C3 (P0=C3×Pr).

As shown in FIG. 3A, at the time of measuring a real return loss, the first optical connector 8 of the optical fiber 5 is connected to the master optical connector 7, and the second optical connector 9 is terminated with the refractive index matching material 6. Since the power Pd at which light enters the optical fiber 5 has been computed, the power of reflected light is determined by means of multiplying the incidence power Pd by the reflectivity R of the optical fiber 5. Further, since the transmission coefficient C1 has already been known, the reflectivity R of the optical fiber 5 can be computed by means of measuring the power Pa of the light received by the first optical sensor 3. It should be noted that the power Pa of the light received by the first optical sensor 3 includes the system reflection P0. Consequently, this must be taken into consideration when the reflectivity R of the optical fiber 5 is computed.

Procedures for computing a return loss are as follows:

Power Pd at which light enters the optical fiber 5 is expressed as Eq. (2).

$$Pd = Pr/C2 \qquad (2)$$

System reflection $P0 = C3 \times Pr$

Power of the light which enters the first optical sensor 3 after having been reflected by the optical fiber 5 is expressed as Eq. (3).

$$Pa - P0 = R \times (C1/C2) \times Pr \qquad (3)$$

Reflectivity R is expressed by Eq. (4).

$$R = (Pa - C3 \times Pr)/Pr/(C1/C2) \qquad (4)$$

A return loss is determined by Eq. (5).

$$RL \text{ (return loss)} = -10 \log R = -10 \log \{(Pa - C3 \times Pr)/Pr\} + 10 \log(C1/C2) \qquad (5)$$

Figure 4A:
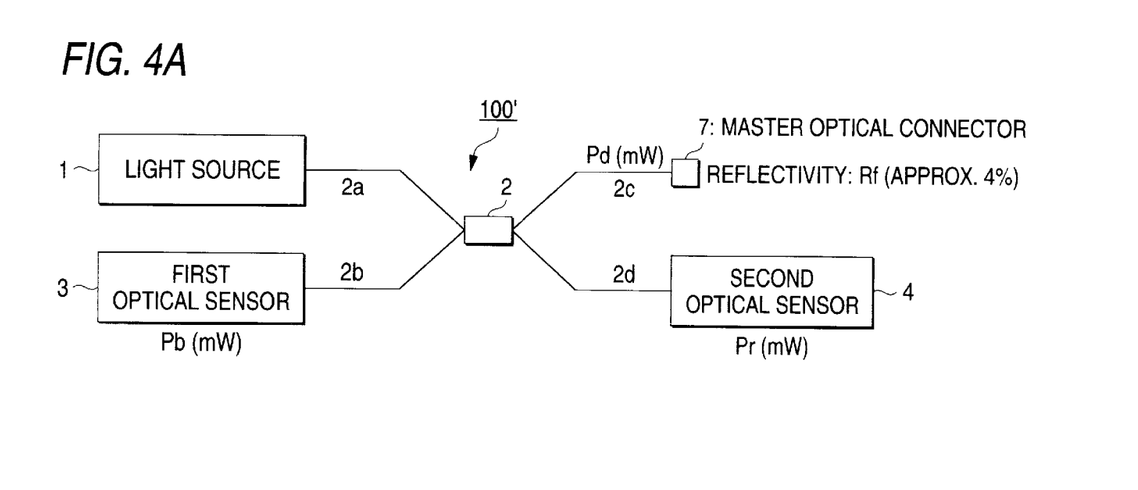
FIGS. 4A and 4B are illustrations for describing a method of measuring an insertion loss employed by the inspection apparatus 100 according to the present invention.

FIG. 4 shows a method of measuring an insertion loss of an optical connector. As shown in FIG. 4A, in measurement of an insertion loss of an optical connector according to the present invention, the power Pb of light received by the first optical sensor 3 is measured while the master optical connector 7 is released, and the thus-measured power Pb is taken as a reference value. The tip end of the master optical connector 7 is spherically ground. The reflectivity of the master optical connector 7 corresponds to Fresnel reflection (Rf=about 4%) arising from a difference in refractive index between quartz serving as a core material of the optical fiber and air.

Figure 4B:
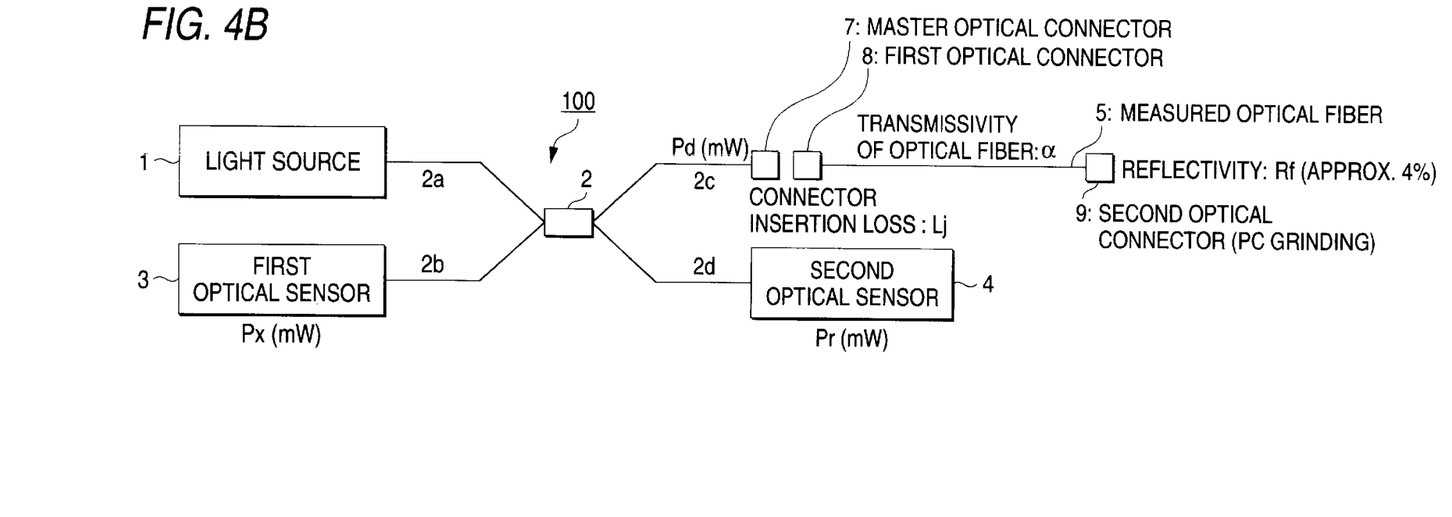

As shown in FIG. 4B, the first optical connector 8 of the measured optical fiber 5 is connected to the master optical connector 7. Power Px of light received by the first optical sensor 3 is measured while the second optical connector 9 is released. At this time, the second optical connector 9 of the measured optical fiber 5 is required to have been subjected to the same face processing as that to which the master optical connector 7 has been subjected. The reflectivity of the second optical connector 9 corresponds to Fresnel reflection (Rf=about 4%) arising from a difference in refractive index between quartz serving as a core material of the optical fiber 5 and air.

In contrast with the reference value Pb, the power Px of the light received by the first optical sensor 3 includes a loss which is double an insertion loss between the master optical connector 7 and the first optical connector 8. Further, the power Px includes a loss which is double a transmission loss of an optical fiber portion of the measured optical fiber 5. Accordingly, these must be taken into consideration at the time of computation of an insertion loss of an optical connector.

Procedures for computing an insertion loss of an optical connector are as follows: Here, system constants are identical with those used in measuring the return loss.

Power of the light received by the first optical sensor 3 while the master optical connector 7 is released (i.e., a reference value Pb) is expressed as Eq. (6).

$$Pb = Rf \times (C1/C2) \times Pr \qquad (6)$$

The master optical connector 7 is connected to a first optical connector 8 of the measured optical fiber 5, and the power of light received by the first optical sensor 3 while the second optical connector 9 is released is expressed as Eq. (7).

$$Px - Pb = Rf \times (C1/C2) \times Pr \times \{(1-Lj) \times \alpha\}^2 \qquad (7)$$

where Lj denotes an insertion loss between the master optical connector 7 and the first optical connector 8, and α designates the transmissivity of an optical fiber portion of the measured optical fiber 5.

An insertion loss is determined by Eq. (8).

$$IL \text{ (insertion loss)} = -\tfrac{1}{2} \times \{10 \log(Px - Pb)/Pb - 2 \times 10 \log \alpha\} \qquad (8)$$

An operation of the fiber inspection system will now be described.

First will be described flow of measurement processing which is to be performed by the measurement unit 10 when the inspection apparatus 100 measures a return loss.

A measurement processing program stored in the storage device 15 is read and uncompressed into a program storage area of the RAM 14 of the measurement unit 10. System constants (i.e., a transmission coefficient C1 and a branching ratio C2) and parameters required for computation (i.e., a Fresnel reflectivity Rf and the transmissivity α of an optical fiber portion) have been measured, input, and saved in a memory location of the RAM 14 of the measurement unit 10 beforehand.

In order to measure the system reflection P0, the third terminal 2c of the optical branching coupler 2 is terminated, and the first optical sensor 3 receives reflected light. The power of the thus-received light is saved in the RAM 14 as system reflection P0, which is a reference value to be used for computing a return loss.

During measurement of a return loss, the master optical connector 7 of the fiber inspection apparatus 100 is connected to the first optical connector 8 of the measured optical fiber 5, and the second optical connector 9 is terminated with the refractive index matching material 6 (see FIG. 3A).

In this state, the CPU 11 measures the power Pa of the light received by the first optical sensor 3 and the power Pr of the light received by the second optical sensor 4. The thus-measured power values Pa and Pr are saved in the RAM 14. The CPU 11 then reads the system constants (i.e., the transmission coefficient C1, the branching ratio C2, and the transfer constant C3) and the received light data Pa from the RAM 14. The CPU 11 performs arithmetic operation according to the return loss computation expression (5), and the return loss corresponding to a result of computation is saved in the RAM 14 and displayed on the display section 13.

Next will be described the flow of measurement processing which is to be performed by the measurement unit 10 when the inspection apparatus 100 measures an insertion loss.

During measurement of an insertion loss, the master optical connector 7 is released for computing a reference value (see FIG. 4A). In this state, the power of light received by the first optical sensor is measured. The thus-measured power is taken as a reference insertion loss Pb and saved in the RAM 14.

The first optical connector 8 of the optical fiber 5 is connected to the master optical connector 7, and the second optical connector 9 is released (see FIG. 4A).

The CPU 11 measures the power Px of light received by the first optical sensor 3, and the thus-measured power Px is saved in the RAM 14 as received light data. System constants (i.e., the transmission coefficient C1 and the branching ratio C2), parameters required for computation (the transmissivity α of an optical fiber portion and the Fresnel reflectivity Rf) and the received light data Px are read from the RAM 14. The CPU 11 performs arithmetic operation according to the insertion loss computation expression (8), and an insertion loss, which is a result of computation, is saved in the RAM 14 and displayed on the display section 13.

As described above, the inspection apparatus 100 according to the first embodiment is constituted by connecting the light source 1 to the first terminal 2a of the optical branch coupler 2; connecting the first optical sensor 3 to the second terminal 2b; connecting the second optical sensor 4 to the fourth terminal 2d; and connecting the master optical connector 7 to the third terminal 2c. The Fresnel reflection, which arises while the master optical connector 7 is released, is received by the first optical sensor 3. The light originating from the light source 1 is received by the second optical sensor 4, and system constants (a transmission coefficient C1 and a branching ratio C2) are determined from the powers of these received lights.

When an insertion loss is measured, the master optical connector 7 is first released, and the power Pb of the light received by the first optical sensor 3 is measured. The thus-measured power Pb is taken as a reference value and stored in the RAM 14. The master optical connector 7 is connected to the measured optical fiber 5, and there is measured the power Px of the light received by the first optical sensor 3 while the outgoing end (i.e., the second optical connector 9) is released.

In a case of measuring a return loss, the power Pr of the light received by the second optical sensor is measured, and the system reflection P0 is computed (P0=C3×Pr) from the received light power Pr and the system constant C3 (=P0× Pr). The thus-computed system reflection P0 is stored in the RAM 14. Further, while the measured optical fiber 5 is connected to the master optical connector 7 and the outgoing end (i.e., the second optical sensor 9) is terminated, the power Pa of the light received by the first optical sensor 3 and the power Pr of the light received by the second optical sensor 4 are measured. From the received light powers Pa and Pr and the system constants (C1, C2, and C3), the measurement unit 10 computes a return loss by means of the return loss computation equation (5).

As a result, the return loss and insertion loss of the measured optical fiber 5 can be measured through use of a single measurement system, thereby obviating a necessity of reconnecting the optical fiber 5 according to measurement item.

[Second Embodiment]

A fiber inspection apparatus 100 according to a second embodiment of the present invention will now be described.

In a case where an optical fiber portion of the measured optical fiber 5 is long, the influence of transmission loss of the optical fiber on an insertion loss cannot be ignored. For this reason, it is desired to measure an insertion loss in consideration of transmission loss of the optical fiber.

The fiber inspection apparatus 100 according to the second embodiment is identical in construction with that shown in FIGS. 1 and 2. Specifically, the fiber inspection apparatus 100 comprises a light source 1; an optical branch coupler 2; a first optical sensor 3; a second optical sensor 4; a refractive index matching material 6; a master optical connector 7; and a measurement unit 10. The measurement unit 10 comprises a CPU 11; an input unit 12; a display section 13; RAM 14; a storage device 15; and an I/F section 16. These elements are identical with those described in the first embodiment, and hence their repeated explanations are omitted. Characteristic portions of the inspection apparatus 100 according to the present embodiment will now be described.

In the second embodiment, a per-length transmission loss of an optical fiber portion of the measured optical fiber 5 is registered in the storage device 15 in advance.

The CPU 11 performs the following processing after measuring the total insertion loss of the measured optical fiber 5 (including the insertion loss of the connector and the transmission loss of the optical fiber) in the same process as measuring process in the first embodiment. The thus-measured total insertion loss is stored in the RAM 14.

The CPU 11 stores into the RAM 14 the length of the optical fiber entered by way of the input unit 12. A per-unit transmission loss of the optical fiber stored in the storage device 15 is read, and the thus-read transmission loss is stored in the RAM 14. The CPU 11 reads the thus-input length of the optical fiber and the unit-length transmission loss from the RAM 14. A transmission loss of the optical fiber portion is computed by means of multiplying the thus-read length by the per-length transmission loss. The CPU 11 subtracts the thus-computed transmission loss of the optical fiber portion from the total insertion loss, thereby obtaining the insertion loss of only the optical connector. The result of computation is stored in the RAM 14 and displayed on the display section 13.

In the fiber inspection apparatus 100 according to the second embodiment, the transmission loss of the optical fiber portion is automatically subtracted from the total insertion loss measured through the measurement processing described in the first embodiment, thereby enabling computation of an insertion loss of only an optical connector. Accordingly, an insertion loss of an optical connector can be readily determined while the influence of transmission loss of the optical fiber portion on the insertion loss is eliminated, thereby determining whether the connector is defective or non-defective.

In the second embodiment, a transmission loss of an optical fiber portion [i.e., α in Eq. (8)] may be registered directly in the storage device 15.

In this case, the CPU 11 reads the transmission loss of the optical fiber portion from the storage device 15. The thus-read transmission loss is subtracted from the total insertion loss, and whereby the insertion loss of only the optical connector is computed. The result of computation is stored in the RAM 14 and displayed on the display section 13.

As a result, the insertion loss of only the optical connector portion can be quickly computed by means of omitting the process for computing a transmission loss of an optical fiber portion.

[Third Embodiment]

An inspection apparatus 100 according to a third embodiment of the present invention will now be described. During the measurement processing described in the first embodiment, the total return loss of the optical fiber 5 is measured through use of Eq. (5). In the case of a long optical fiber, an amount of the backscattering of the optical fiber cannot be ignored. Accordingly, it is desired to define the return loss of the optical connector in consideration of the amount of the backscattering of the optical fiber.

The fiber inspection apparatus 100 according to the third embodiment is identical in construction with that shown in FIGS. 1 and 2. Specifically, the fiber inspection apparatus 100 comprises a light source 1; an optical branch coupler 2; a first optical sensor 3; a second optical sensor 4; a refractive index matching material 6; a master optical connector 7; and a measurement unit 10. The measurement unit 10 comprises a CPU 11; an input unit 12; a display section 13; RAM 14;

a storage device 15, and an I/F section 16. These elements are identical with those described in the first embodiment, and hence their repeated explanations are omitted. Characteristic portions of the inspection apparatus 100 according to the present embodiment will now be described.

In the third embodiment, a per-length amount of the backscattering of an optical fiber portion is registered in the storage device 15 in advance.

The CPU 11 performs the following processing after measuring the total return loss of the measured optical fiber 5 (including a return loss of the connector and the amount of the backscattering loss of the optical fiber) in the same process as measuring process in the first embodiment. The thus-measured total return loss is stored in the RAM 14.

The CPU 11 stores into the RAM 14 the length of the optical fiber entered by way of the input unit 12. The unit-length amount of the backscattering of the optical fiber stored in the storage device 15 is read, and the thus-read unit-length amount of the backscattering is stored in the RAM 14. The CPU 11 reads the input length of the optical fiber and the unit-length amount of the backscattering from the RAM 14. The amount of the backscattering of the measured optical fiber 5 is computed by means of multiplying the thus-read length by the unit-length amount of the backscattering. The CPU 11 subtracts the thus-computed amount of the backscattering of the optical fiber 5 from the total return loss, thereby obtaining the return loss of only the optical connector. The result of computation is stored in the PAM 14 and displayed on the display section 13.

In the fiber inspection apparatus 100 according to the third embodiment, the amount of the backscattering of the measured optical fiber 5 is automatically subtracted from the total insertion loss measured through the measurement processing described in the first embodiment, thereby enabling computation of the return loss of only the optical connector. Accordingly, even in the case of a long optical fiber, the return loss of the optical connector can be readily determined while the influence of backscattering of the optical fiber on the return loss is eliminated, thereby determining whether the connector is defective or non-defective.

In the third embodiment, the amount of the backscattering of the optical fiber may be registered directly in the storage device 15.

In this case, the CPU 11 reads the amount of the backscattering of the optical fiber from the storage device 15. The thus-read amount of the backscattering is subtracted from the total return loss, and whereby the return loss of only the optical connector is computed. The result of computation is stored in the RAM 14 and displayed on the display section 13.

As a result, the return loss of only the optical connector portion can be quickly computed by means of omitting the process for computing the amount of the backscattering of the optical fiber.

[Fourth Embodiment]

A fiber inspection apparatus 100 according to a fourth embodiment of the present invention will now be described. In the fourth embodiment, after measuring a return loss and insertion loss of an optical connector, a determination is made as to whether the optical connector is defective or non-defective, by reference to previously-registered defective/non-defective determination reference values. In a manufacturing process, a defective/non-defective determination test is often performed easily for checking the quality of a product before inspection data pertaining to the product is acquired. To this end, it is effective to simply check whether or not a product has satisfied a defective/non-defective determination reference previously set by a manufacturer.

The fiber inspection apparatus 100 according to the fourth embodiment is identical in construction with that shown in FIGS. 1 and 2. Specifically, the fiber inspection apparatus 100 comprises a light source 1; an optical branch coupler 2; a first optical sensor 3; a second optical sensor 4; a refractive index matching material 6; a master optical connector 7, and a measurement unit 10. The measurement unit 10 comprises a CPU 11; an input unit 12; a display section 13; RAM 14; a storage device 15, and an I/F section 16. These elements are identical with those described the first embodiment, and hence their repeated explanations are omitted. Characteristic portions of the inspection apparatus 100 according to the present embodiment will now be described.

In a fourth embodiment, defective/non-defective determination reference values are set and registered in the storage device 15 in advance. The defective/non-defective determination reference values are set by an inspector in advance. The defective/non-defective determination reference values are set in a return loss and an insertion loss, respectively.

The CPU 11 performs the following processing after measuring the return loss of the measured optical fiber 5 (or the return loss of the connector after subtraction of the amount of backscattering) and the insertion loss (or the insertion loss of the optical connector portion after subtraction of the transmission loss of the optical fiber portion) in the same process as measuring process in any one of the first, second, and third embodiments.

The CPU 11 reads the defective/non-defective determination reference values from the storage device 15. The defective/non-defective determination reference values are compared with the measured return loss and the measured insertion loss, respectively, thereby determining whether or not the fiber having optical connectors is defective. Results of determination are stored in the RAM 14 and displayed on the display section 13.

As described above, the inspection apparatus 100 according to the fourth embodiment compares the return loss and the insertion loss measured in any one of the first, second, and third embodiments with the previously-registered defective/non-defective determination reference values, respectively, thereby automatically determining whether or not the fiber having optical connectors is defective. Results of determination are output. Accordingly, a determination can be readily made as to whether or not the fiber having optical connectors is defective, without examination of real data concerning the return loss and the insertion loss. Accordingly, a fiber having optical connectors can be inspected efficiently, thereby improving working efficiency in a manufacturing process.

In the above described embodiments, at the time of measurement of the return loss and the insertion loss, the coefficients required for computation and the system constants are set beforehand and used for computation. Further, inspection conditions compliant with the length of the measured optical fiber, other special inspection conditions, and a computation equation compliant with the conditions may be set. Under these conditions, the return loss and the insertion loss may be computed.

Results of measurement of the return loss and the insertion loss are displayed on the display section 13. However, the present invention is not limited to this type of output. The measurement results may be output in an arbitrary manner; for instance, the fiber inspection apparatus 100 is connected to a printer, and results of measurement may be printed out. Alternatively, results of measurement may be transmitted to external equipment and stored in a storage medium.

In the above described embodiments, the program and the data pertaining to measurement processing are stored in the storage device 15. The measurement is performed by means of the program and data. However, the present invention is not limited to this configuration. A storage medium having the processing program and data stored therein may be provided in external equipment, such as a personal computer or a server, and the processing program may be installed into the inspection apparatus 100 from the external equipment.

Setting of the power of light originating from a light source and setting of measurement conditions corresponding to the power of light may be changed arbitrarily. In accordance with material of the measured optical fiber, a coefficient (i.e., the value of Fresnel reflection Rf) required for computation may be changed, as required.

According to a first aspect of the invention, the return loss and insertion loss of the measured optical fiber are measured through use of a single measurement system, thereby obviating a necessity for reconnecting the optical fiber according to measurement items. Consequently, production efficiency in process of manufacturing a fiber having optical connectors is improved.

According to a second aspect and a third aspect of the invention, a transmission loss of an optical fiber portion can be subtracted from a result of measurement of total insertion loss. Hence, an insertion loss of an optical connector becomes definite, thereby enabling an easy determination as to whether or not a processed optical connector is non-defective. Particularly, the present invention is effective in the case of a long optical fiber.

According to a fourth aspect and a fifth aspect of the invention, an amount of backscattering of an optical fiber portion can be subtracted from a result of measurement of a total return loss. Accordingly, the insertion loss of an optical connector becomes definite, thereby enabling an easy determination as to whether or not a processed optical connector is non-defective. Particularly, the present invention is effective in the case of a long optical fiber.

According to a sixth aspect of the invention, since a determination as to whether or not a fiber having optical connectors is non-defective is made automatically, whether or not the fiber is non-defective can be checked readily, without involvement of examination of real data concerning a return loss and an insertion loss. Thus, a fiber having optical connectors can be inspected efficiently.

What is claimed is:

1. An inspection apparatus for inspecting an optical fiber having two optical connectors at both ends thereof, comprising:

an optical branch coupler having four input/output terminal, the optical branch coupler branching and outputting light to third and fourth terminals when the first or second terminal is taken as an input terminal, the optical branch coupler branching and outputting light to the first and second terminals when the third or fourth terminal is taken as an input terminal;

a light source connected to the first terminal of the optical branch coupler;

a first optical sensor connected to the second terminal of the optical branch coupler;

a second optical sensor connected to the fourth terminal of the optical branch coupler;

a master optical connector connected to the third terminal of the optical branch coupler; and a measurement unit connected to the first and second optical sensors, wherein Fresnel reflection occurs in a state where the master optical connector is released, power of the Fresnel reflection received by the first optical sensor is defined as a first reference;

the measurement unit measures an insertion loss based on the first reference and power of light received by the first optical sensor when one of two optical connectors of the optical fiber is connected to the master optical connector and the other thereof is released; and when one of two optical connectors of the optical fiber is connected to the master optical connector and the other thereof is terminated, the measurement unit measures a total return loss based on power of light received by the first optical sensor and power of light emitted from the light source and received by the second optical sensor.

2. The inspection apparatus according to claim 1, further comprising:

a unit transmission loss storage section adapted to store a transmission loss of the optical fiber per unit-length in advance; and an input unit adapted to input a length of the optical fiber, wherein the measurement unit includes a connector insertion loss computation section adapted to compute a transmission loss of the optical fiber from the transmission loss of the optical fiber per unit-length and the length of the optical fiber, the connector insertion loss computation section adapted to compute an insertion loss of an optical connector portion by means of subtracting the transmission loss of the optical fiber from the insertion loss.

3. The inspection apparatus according to claim 1, further comprising a fiber transmission loss storage section adapted to store in advance a transmission loss of the optical fiber, and the measurement unit includes a connector insertion loss computation section adapted to compute an insertion loss of an optical connector portion by means of subtracting the transmission loss of the optical fiber from the insertion loss.

4. The inspection apparatus according to claim 1, further comprising:

a unit backscattering amount storage section adapted to store an amount of backscattering of the optical fiber per unit-length in advance; and an input unit adapted to input a length of the optical fiber, wherein the measurement unit includes a connector return loss computation section adapted to compute an amount of backscattering of the optical fiber from the amount of the backscattering of the optical fiber per unit-length and the length of the optical fiber, the connector return loss computation section adapted to compute a return loss of an optical connector portion by means of subtracting the amount of the backscattering of the optical fiber from the total return loss.

5. The inspection apparatus according to claim 1, further comprising an optical fiber backscattering amount storage section adapted to store an amount of backscattering of the optical fiber beforehand, wherein the measurement unit includes a connector return loss computation section adapted to compute a return loss of an optical connector portion by means of subtracting the amount of the backscattering of the optical fiber from the total return loss.

6. The inspection apparatus according to claim 1, further comprising:

a defective/non-defective determination reference value setting unit adapted to set defective/non-defective determination reference values in relation to a return loss and an insertion loss, respectively; and a determination section adapted to determine whether or not the optical fiber having the optical connectors is defective, by means of comparing the defective/non-defective determination reference values with the return loss and the insertion loss, respectively.

* * * * *